ably poured into ice or cold water, the product collected in an appropriate solvent which is thereafter washed with successive portions of a mildly basic solution and water

United States Patent Office 2,727,910
Patented Dec. 20, 1955

2,727,910

14α-HYDROXYTESTOSTERONE AND ESTERS

Herbert C. Murray, Hickory Corners, and Durey H. Peterson, Kalamazoo, Mich., assignors to The Upjohn Company, Kalamazoo, Mich., a corporation of Michigan No Drawing. Application August 28, 1952, Serial No. 306,922

12 Claims. (Cl. 260—397.45)

This invention relates to steroid compounds and more particularly to 14α-hydroxytestosterone, 14α-hydroxy-10-normethyltestosterone and their esters.

The esters are prepared from the novel 14α-hydroxytestosterone and 14α-hydroxy-10-normethyltestosterone, by esterification of the hydroxy groups, which may be prepared by subjecting testosterone or 10-normethyltestosterone to the oxygenating action of a culture of fungus of the order Mucorales as described in our applications, of which this is a continuation-in-part, Serial No. 180,496, filed August 19, 1950, now abandoned; Serial No. 272,-944, filed February 23, 1952, now Patent 2,602,769, issued July 8, 1952; and Serial No. 297,242, filed July 5, 1952.

It is an object of this invention to provide novel esters of 14α-hydroxytestosterone, 14α-hydroxy-10-normethyltestosterone and their esters. Another object is the provision of a novel process for the production thereof. Other objects will be apparent to those skilled in the art to which this invention pertains.

The novel compounds of the present invention are represented by the following formula:

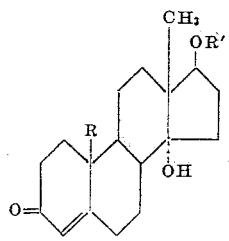

wherein R is hydrogen or methyl and R' is hydrogen or the acid radical of a carboxylic acid containing from one to eight carbon atoms inclusively and selected from the group consisting of aliphatic acids and carbocyclic acids.

The ester products of the present invention have been found to be a readily purified and stable form of the free hydroxy compound.

In the esterification process of the present invention, the 14α-hydroxytestosterone or 14α-hydroxy-10-normethyltestosterone is admixed with an acylating agent such as, for example, ketene, a ketene of a selected acid, an acid, acid chloride or acid anhydride, or other known acylating agent, usually in a solvent such as, for example, pyridine or the like, or an inert solvent, including solvents like benzene, toluene, ether, and the like, for example, and heated at a temperature between about zero degrees centigrade and the boiling point of the reaction mixture usually about room temperature, for a period between about a half hour and about 96 hours. The time of reaction as well as the temperature at which the reaction is carried out, the acylating agent, and the ratio of reactants may be varied. The reaction mixture is suitably poured into ice or cold water, the product collected in an appropriate solvent which is thereafter washed with successive portions of a mildly basic solution and water to obtain a solution of the product which is essentially neutral.

In some instances, the product may crystallize from the reaction mixture, in which case it may be advantageous to separate the product by filtration or other means, wash with water, and thereafter purify by conventional means, such as, for example, by recrystallization from a suitable solvent or by chromatographic purification, as deemed necessary.

The following examples are illustrative of the process and products of the present invention, but are not to be construed as limiting.

Example 1.—14α-hydroxytestosterone

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Twelve liters of this sterilized medium was inoculated with Mucor griseo syanus, American Type Culture Collection Number 1207a(+), and incubated for 24 hours at a temperature of 28 degrees centigrade using a rate of aeration and stirring such that the oxygen uptake was 6.3 to 7 millimoles per hour per liter of Na₂SO₃ according to the method of Cooper, Fernstrom and Miller, Ind. Eng. Chem., 36, 504 (1944). To this medium containing a 24 hour growth of Mucor griseo cyainus was added 1.5 grams of testosterone in thirty milliliters of absolute ethanol to provide a suspension of the steroid in the culture. After an additional 24 hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The semicrystalline extractives obtained upon evaporation of the methylene chloride solvent weighed 6.73 grams.

Partial decolorization of the crude extractives was effected by taking them up with 35 milliliters of methylene chloride, adding three grams of Magnesol synthetic magnesium silicate and filtering. Upon evaporation of the solvent, the residue was taken up in an excess of acetone, mixed with 0.2 gram of Celite No. 545 diatomaceous earth, filtered, and evaporated to dryness. This residue was dissolved in 100 milliliters of benzene and fractioned over 340 grams of alumina (washed with hydrochloric acid and dried at 120 degrees centigrade) with 325 milliliter portions of solvent fractions as in the table.

Fraction 22 shown in the table, was triturated with one milliliter of acetone and three milliliters of ether, and filtered. The resulting crystalline residue was combined with fractions 17 to 21 and recrystallized from ten milliliters of acetone by additions of ether. Recrystallization gave 1.577 grams of crude 14α-hydroxytestosterone, melting at 184 to 186 degrees centigrade. Recrystallization twice more gave 14α-hydroxytestosterone having a melting point of 185 to 187 degrees centigrade and an optical rotation [α]_D^{23} of plus 124 degrees (0.974 in chloroform). Infrared spectrum showed the presence of an additional hydroxyl on testosterone.

*Analysis.*—Calculated for $C_{19}H_{28}O_3$: C, 74.96; H, 9.27. Found: C, 74.69; H, 9.27.

TABLE

| Fraction | Solvent | Eluate Solids, Milligrams |
|---|---|---|
| 1 | benzene | 138.0 |
| 2 | do | 89.5 |
| 3 | benzene plus 50 percent ether | 223.5 |
| 4 | ether | 27.5 |
| 5 | do | 13.5 |
| 6 | ether plus 5 percent chloroform | 10.5 |
| 7 | do | 9.5 |
| 8 | ether plus 10 percent chloroform | 11.5 |
| 9 | do | 20.5 |
| 10 | ether plus 20 percent chloroform | 38.0 |
| 11 | do | 40.5 |
| 12 | ether plus 50 percent chloroform | 216.0 |
| 13 | do | 942.5 |
| 14 | chloroform | 545.0 |
| 15 | do | 149.5 |
| 16 | chloroform plus 5 percent acetone | 213.0 |
| 17 | do | 293.0 |
| 18 | chloroform plus 10 percent acetone | 309.0 |
| 19 | do | 236.0 |
| 20 | chloroform plus 20 percent acetone | 508.5 |
| 21 | do | 320.0 |
| 22 | chloroform plus 50 percent acetone | 1,120.0 |
| 23 | do | 396.5 |
| 24 | acetone | 97.5 |
| 25 | do | 145.0 |
| 26 | acetone plus 5 percent methanol | 163.5 |
| 27 | acetone plus 10 percent methanol | 134.5 |
| 28 | do | 65.5 |
| 29 | methanol | 115.0 |
| | | 6,592.5 |

*Example 2.—14α-hydroxy-10-normethyltestosterone*

In the same manner as described in Preparation 1, 14α-hydroxy-10-normethyletestosterone is prepared from 10-normethyltestosterone, [Birch, J. Chem. Soc., (London) 1950, 367] by subjecting the latter steroid to the oxygenating activity of Mucor griseo cyanus, American Type Culture Collection Number 1207a(+). The resulting oxygenated steroid is isolated from the fermentation mixture in the same manner as described in Example 1 and purified 14α-hydroxy-10-normethyltestosterone is obtained by crystallization of the reaction product from ethyl acetate.

*Example 3.—14α-hydroxytestosterone-17-acetate*

To 65 milligrams of 14α-hydroxytestosterone dissolved in two milliliters of barium oxide dried pyridine was added one milliliter (0.452 millimole) of a solution of 0.462 milliliter of redistilled acetic anhydride diluted to ten milliliters with dry pyridine and the reaction mixture maintained at room temperature for sixteen hours. The reaction mixture was then diluted to fifty milliliters and thereafter placed in a refrigerator for 24 hours. The reaction product was extracted with ether. The extracts were washed with successive portions of ten percent hydrochloric acid, five percent sodium bicarbonate solution, and water. After drying in a vacuum at sixty degrees centigrade 64 milligrams of a crystalline residue was obtained. The residue was recrystallized twice from acetone plus fifty percent ether to give thirty milligrams of 14α-hydroxytestosterone-17-acetate melting at 198 to 200 degrees centigrade and having an $[\alpha]_D^{23}$ of plus 114 degrees (0.775 in chloroform). Infrared spectrum corroborated its structure as a monoacetate.

*Analysis.*—Calculated for $C_{21}H_{30}O_4$: C, 72.80; H, 8.73. Found: C, 72.99; H, 8.61.

*Example 4.—14α-hydroxytestosterone-17-formate*

In the same manner as Example 3, 14α-hydroxytestosterone-17-formate is prepared by reacting 14α-hydroxytestosterone with more than about one equivalent of formic acid.

*Example 5.—14α-hydroxytestosterone-17-propionate*

In the same manner as Example 3, 14α-hydroxytestosterone-17-propionate is prepared by reacting 14α-hydroxytestosterone with more than about one equivalent of propionic anhydride in pyridine.

*Example 6.—14α-hydroxytestosterone-17-β-cyclopentylpropionate*

In the same manner as Example 3, 14α-hydroxytestosterone-β-cyclopentyl propionate is prepared by reacting 14α-hydroxytestosterone with more than about one equivalent of β-cyclopentylpropionyl chloride in pyridine.

*Example 7.—14α-hydroxytestosterone-17-benzoate*

In the same manner as Example 3, 14α-hydroxytestosterone-17-benzoate is prepared by reacting 14α-hydroxytestosterone with more than about one molar equivalent of benzoyl chloride in pyridine.

*Example 8.—14α-hydroxy-10-normethyltestosterone-17-acetate*

In the same manner as Example 3, 14α-hydroxy-10-normethyltestosterone-17-acetate is prepared by reacting 14α-hydroxy-10-normethyltestosterone with more than about one equivalent of acetic anhydride in pyridine.

*Example 9.—14α-hydroxy-10-normethyltestosterone-17-formate*

In the same manner as Example 3, 14α-hydroxy-10-normethyltestosterone-17-formate is prepared by reacting 14α-hydroxy-10-normethyltestosterone with more than about one equivalent of formic acid.

*Example 10.—14α-hydroxy-10-normethyltestosterone-17-propionate*

In the same manner as Example 3, 14α-hydroxy-10-normethyltestosterone-17-propionate is prepared by reacting 14α-hydroxy-10-normethyltestosterone with more than about one equivalent of propionic anhydride in pyridine.

*Example 11.—14α-hydroxy-10-normethyltetosterone-17-β-cyclopentylpropionate*

In the same manner as Example 3, 14α-hydroxy-10-normethyltestosterone-17-β-cyclopentylpropionate is prepared by reacting 14α-hydroxy-10-normethyltestosterone with more than about one equivalent of β-cyclopentylpropionyl chloride in pyridine.

*Example 12.—14α-hydroxy-10-normethyltestosterone-17-benzoate*

In the same manner as Example 3, 14α-hydroxy-10-normethyltestosterone-17-benzoate is prepared by reacting 14α-hydroxy-10-normethyltesterone with more than about one molar equivalent of benzoyl chloride in pyridine.

In a similar manner, other esters of 14α-hydroxytestosterone and 14α-hydroxy-10-normethyltestosterone are prepared according to acylation procedures, as illustrated above or by reaction with ketene, ketenes of selected acids, selected acids, acid anhydrides, or acid chlorides, in an organic solvent such as pyridine or the like. Representative esters of 14α-hydroxytesterone and 14α-hydroxy-10-normethyltestosterone thus-prepared include one to eight carbon atom carboxylic acid acyloxy esters of saturated or unsaturated, aliphatic, carbocyclic, or cycloaliphatic, aryl, arylalkyl, alkaryl, mono, di or polycarboxylic acids which form ester groups such as, for example, formyloxy, acetoxy, propionyloxy, dimethylacetoxy, trimethyloxy, butyryloxy, valeryloxy, hexanoyloxy, heptanoyloxy, octanoyloxy, benzoxy, phenylacetoxy, toluoyloxy, cyclopentylformyloxy, β-cyclopentylpropionyloxy, acrylyloxy, cyclohexylformyloxy, the half and di-esters of malonic, maleic, succinic, glutaric and adipic acids, and the like. The acids may also contain non-interfering substituents, such as mono or poly halo, chloro, bromo, hydroxy, methoxy, and the like if desired.

The 14α-hydroxytestosterone, 14α-hydroxy - 10 - normethyltestosterone and their esters of this invention have pharmacological activity per se and are useful as chemical intermediates for the production of cardiac active hormones and other steroids which possess pharmacological activity. They demonstrate pronounced anabolic, renotrophic, cardiac, gonadotrophic, folliculloid and androgenic activities.

The oxygenated steroids of this invention possess lyophobic and an increased proportion of lyophilic groups causing them to be valuable interfacial tension modifying agents useful as emulsifying agents, emulsion breakers, suspending agents, and emulsion stabilizing agents. They may be used to prepare absorption bases having improved water absorption and emollient characteristics of utility in pharmacy and cosmetology alone or as carriers for known medicaments. A suitable absorption base preparation may be made by melting together a mixture of 85 percent white petrolatum, ten percent stearyl alcohol, and five percent oxygenated steroid, for example, 14α-hydroxytestosterone-17-acetate, and cooling the mixture while stirring until it congeals. The resulting absorption base may be readily triturated with aqueous material, at room temperature, or emulsified at elevated temperature, to form a smooth and stable water-in-oil emulsion.

The 14α-hydroxytestosterone of this invention can be oxidized with chromium trioxide, reduced with sodium borohydride, and acetylated to produce the known 5-androstene-3β,14α-diol-17-one-3-acetate.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:
1. A compound represented by the graphical formula:

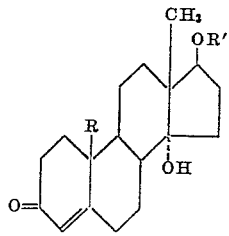

wherein R is selected from the radicals consisting of hydrogen and methyl and R' is selected from the radicals consisting of hydrogen and hydrocarbon-carboxylic acyl radical containing from one to eight carbon atoms, inclusively.

2. 14α-hydroxytestosterone represented by the formula:

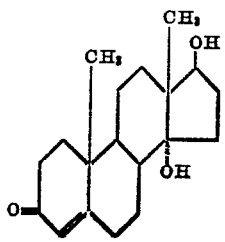

3. 14α - hydroxy-10-normethyltestosterone represented by the formula:

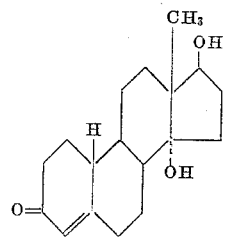

4. A hydrocarbon carboxylic acid ester of a compound selected from the group consisting of 14 -hydroxytestosterone and 14α-hydroxy-10-normethyltestosterone, wherein the hydrocarbon carboxylic acid contains from one to eight carbon atoms inclusively.

5. 14α-hydroxytestosterone-17-acetate.
6. 14α-hydroxy-10-normethyltestosterone-17-acetate.
7. 14α-hydroxy-10-normethyltestosterone - 17 - β-cyclopentylpropionate.

8. A process for the production of a carboxylic acid ester of a compound selected from the group consisting of 14α-hydroxy-testosterone and 14α-hydroxy-10-normethyltestosterone which includes the step of reacting a compound selected from the group consisting of 14α-hydroxytestosterone and 14α - hydroxy - 10 - normethyltestosterone with an acylating agent.

9. A process for the production of a 14α-hydroxytestosterone-17-acylate which includes the step of reacting 14α-hydroxytestosterone with more than about one molar equivalent of an acylating agent to produce a 14α-hydroxytestosterone-17-acylate.

10. A process for the production of 14α-hydroxytestosterone-17-acetate which includes the step of reacting 14α-hydroxytestosterone with more than about one equivalent of acetic anhydride to produce 14α-hydroxytestosterone-17-acetate.

11. A process for the production of a 14α-hydroxy-10-normethyltestosterone-17-acylate which includes the step of reacting 14α-hydroxy - 10 - normethyltestosterone with more than about one molar equivalent of an acylating agent to produce a 14α-hydroxy-10-normethyltestosterone-17-acylate.

12. A process for the production of 14α-hydroxy-10-normethyltestosterone-17-acetate which includes the step of reacting 14α-hydroxy - 10 - normethyltestosterone with more than about one equivalent of acetic anhydride to produce 14α-hydroxy-10-normethyltestosterone-17-acetate.

References Cited in the file of this patent
UNITED STATES PATENTS
2,109,400    Miescher _____ Feb. 22, 1938